United States Patent
Sved et al.

(10) Patent No.: US 7,461,216 B2
(45) Date of Patent: Dec. 2, 2008

(54) MEMORY CONTROLLER

(75) Inventors: Jorge Antonio Sved, Bristol (GB); Neil Thomas Hutchon, Bristol (GB); Anthony James C Cole, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 11/359,501

(22) Filed: Feb. 23, 2006

(65) Prior Publication Data

US 2007/0198782 A1    Aug. 23, 2007

(51) Int. Cl.
*G06F 12/00* (2006.01)
*G06F 13/00* (2006.01)
*G06F 13/28* (2006.01)

(52) U.S. Cl. .................. 711/154; 711/157; 711/158; 711/159; 711/170; 711/171

(58) Field of Classification Search ................. 711/154, 711/157
See application file for complete search history.

(56) References Cited

U.S. PATENT DOCUMENTS

| 4,394,728 | A | 7/1983 | Comfort et al. |
| 6,839,797 | B2 * | 1/2005 | Calle et al. ..................... 711/5 |
| 6,944,731 | B2 * | 9/2005 | Bouchard et al. ........... 711/161 |
| 2003/0018863 | A1 * | 1/2003 | Hill et al. ..................... 711/158 |
| 2004/0186945 | A1 * | 9/2004 | Jeter et al. ..................... 711/5 |

OTHER PUBLICATIONS

Rixner, Scott. "Memory Access Scheduling". 2000. ACM. pp. 128-138.*

* cited by examiner

*Primary Examiner*—Kevin Ellis
*Assistant Examiner*—Ryan Bertram

(57) ABSTRACT

A memory controller for accessing a memory module comprising a plurality of memory banks. The memory controller is operable to write copies of program data to one or more memory banks according to the size of the program data. The memory controller is additionally operable to read program data, e.g. in response to an access request, from whichever memory bank is next available for access.

6 Claims, 1 Drawing Sheet

MEMORY CONTROLLER

CLAIM TO PRIORITY

The present application claims priority to co-pending United Kingdom utility application entitled, "Memory Controller," having serial no. GB 0511438.4 filed Jun. 4, 2005, the disclosure of which is incorporated herein by reference in its entirety.

FIELD OF THE INVENTION

The present invention relates to a memory controller.

BACKGROUND OF THE INVENTION

FIG. 1 illustrates the typical layout of a known computer system, in which a processor 1 and one or more bus masters 2 (e.g. I/O device controllers) are coupled to a memory system 4 via a bus 3.

The memory system 4 comprises a memory controller 5 and a memory module 6 having a plurality of memory banks 7. Access to the memory module 6 is shared by the processor 1 and bus masters 2 and is controlled by the memory controller 4. The memory controller 4 executes access requests received from the processor 1 and bus masters 2 over the bus 3, e.g. read data from or write data to the memory module 6. The memory module 6 stores both program data (i.e. instructions to be executed by the processor 1) and non-program data.

In one particular configuration, shared access is provided to a memory bank 7a storing both program data and non-program data. Whilst storing both program and non-program data in a single memory bank makes efficient use of the available memory, the configuration has the disadvantage that requests to read program data by the processor 1 are delayed if the bank 7a is already being accessed by a bus master 2.

When data stored in a dynamic random access memory (DRAM) bank is accessed, the row of memory cells storing the data is activated (or opened) for access. The row of cells remains activated until such time as a precharge signal is received, whereupon the row of cells is deactivated (or closed). Alternative data stored in an alternative row of cells cannot be accessed until such time as the previous row of cells has been deactivated. There is therefore a delay before data can be read from a memory bank that has already been accessed. Moreover, there may be latency between successive access requests, i.e. the time between two successive access requests (i.e. the cycle time) may be greater than the time taken to complete an access request (i.e. the access time).

Accordingly, when access to a memory bank 7a storing program data is shared, the processor 1 is not able to gain immediate access to the program data if the memory bank 7a is already being accessed by a bus master 2. Consequently, in configurations for which shared access is permitted to a memory bank 7a storing program data, there is an increased latency in reading program data.

The latency of requests to read program data is ideally as short as possible such that the processor 1 is able to quickly retrieve and execute processor instructions. Accordingly, in an alternative configuration, a single dedicated memory bank 7b stores only program data, i.e. access to the memory bank 7b is not shared but it restricted to access by the processor only 1. Whilst this provides for shorter access times in reading program data, only a small fraction of the memory bank 7b is typically used and consequently memory usage is inefficient.

SUMMARY OF THE INVENTION

In a first aspect, the present invention provides a memory controller for coupling to a first memory bank and to a second memory bank, each memory bank storing identical program data, the memory controller being operable to read program data from whichever memory bank is next available for access. Preferably, the memory controller is operable to: receive a request to read program data; and read, in response, program data from whichever memory bank is next available for access.

Conveniently, the first memory bank and the second memory bank store non-program data and the memory controller is further operable to read non-program data from the first memory bank and from the second memory bank.

Advantageously, the memory controller is further operable to write non-program data to the first memory bank and to the second memory bank.

Conveniently, the memory controller is further operable to prioritise requests to read program data ahead of requests to read or write non-program data.

Preferably, the memory controller is further operable to: receive requests to access the memory banks; schedule each received request in a queue; determine, in response to a received request to read program data, which memory bank is next available for access; and schedule a request to read program data from the memory bank that is determined as being next available for access.

More preferably, the request to read program data is scheduled at the head of the queue.

Advantageously, the memory controller is further operable to: receive a request to write program data; write the program data to the first memory bank; and write the program data to the second memory bank.

Conveniently, the memory controller is further operable to: receive a request to write program data; write the program data to the first memory bank; and write the program data to the second memory bank if the size of the program data is not greater than half the size of the first memory bank.

In a second aspect, the present invention provides a memory controller for coupling to a first memory bank and a second memory bank, the memory controller being operable to: receive a request to write program data; write the program data to the first memory bank; and write the program data to the second memory bank.

In a third aspect, the present invention provides a memory controller for coupling to a first memory bank and a second memory bank, the memory controller being operable to: receive a request to write program data; write the program data to the first memory bank; and write the program data to the second memory bank if the size of the program data is not greater than half the size of the first memory bank.

In a fourth aspect, the present invention provides a memory controller for coupling to a first memory bank and to a second memory bank, each memory bank storing identical program data, the memory controller comprising means for reading program data from whichever memory bank is next available for access.

In a fifth aspect, the present invention provides a memory controller for coupling to a first memory bank and a second memory bank, the memory controller comprising: means for receiving a request to write program data; means for writing the program data to the first memory bank; and means for writing the program data to the second memory bank.

In a sixth aspect, the present invention provides a memory controller for coupling to a first memory bank and a second memory bank, the memory controller comprising: means for receiving a request to write program data; means for writing the program data to the first memory bank; and means for writing the program data to the second memory bank if the size of the program data is not greater than half the size of the first memory bank.

In a seventh aspect, the present invention provides a memory module comprising a first memory bank and a second memory bank, each memory bank storing identical program data.

Preferably, the size of the program data is not greater than half the size of the first memory bank or half the size of the second memory bank.

In an eight aspect, the present invention provides a method of accessing a memory module comprising a first memory bank and a second memory bank, each memory bank storing identical program data, the method comprising: receiving a request to read program data; and reading program data from whichever memory bank is next available for access.

In a ninth aspect, the present invention provides a method of accessing a memory module comprising a first memory bank and a second memory bank, The method comprising: receiving a request to write program data; writing the program data to the first memory bank; and writing the program data to the second memory bank.

In a tenth aspect, the present invention provides a method of accessing a memory module comprising a first memory bank and a second memory bank, the method comprising: receiving a request to write program data; writing the program data to the first memory bank; and writing the program data to the second memory bank if the size of the program data is not greater than half the size of the first memory bank.

In an eleventh aspect, the present invention provides a computer program or suite of computer programs executable by a memory controller to perform any one of the above-described methods. The computer program or suite of computer programs may be provided on a computer-readable data storage medium.

BRIEF DESCRIPTION OF THE DRAWINGS

In order that the present invention may be more readily understood, embodiments thereof will now be described, by way of example only, with reference to the accompanying drawings in which.

DETAILED DESCRIPTION

Figure 2:
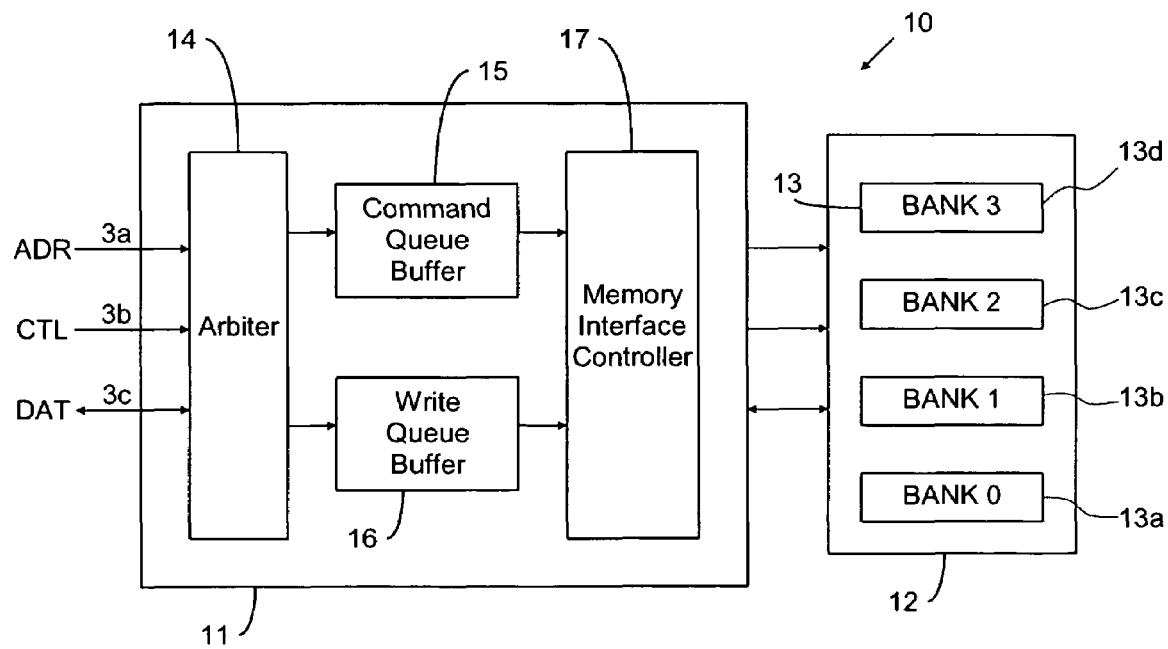
FIG. 2 is a block diagram of a memory system embodying the present invention.

The memory system 10 of FIG. 2 comprises a memory controller 11 and a memory module 12 having a plurality of memory banks 13. The memory controller 11, which is described in more detail below, executes access requests to the memory module 12 that are received over a bus.

Figure 1:
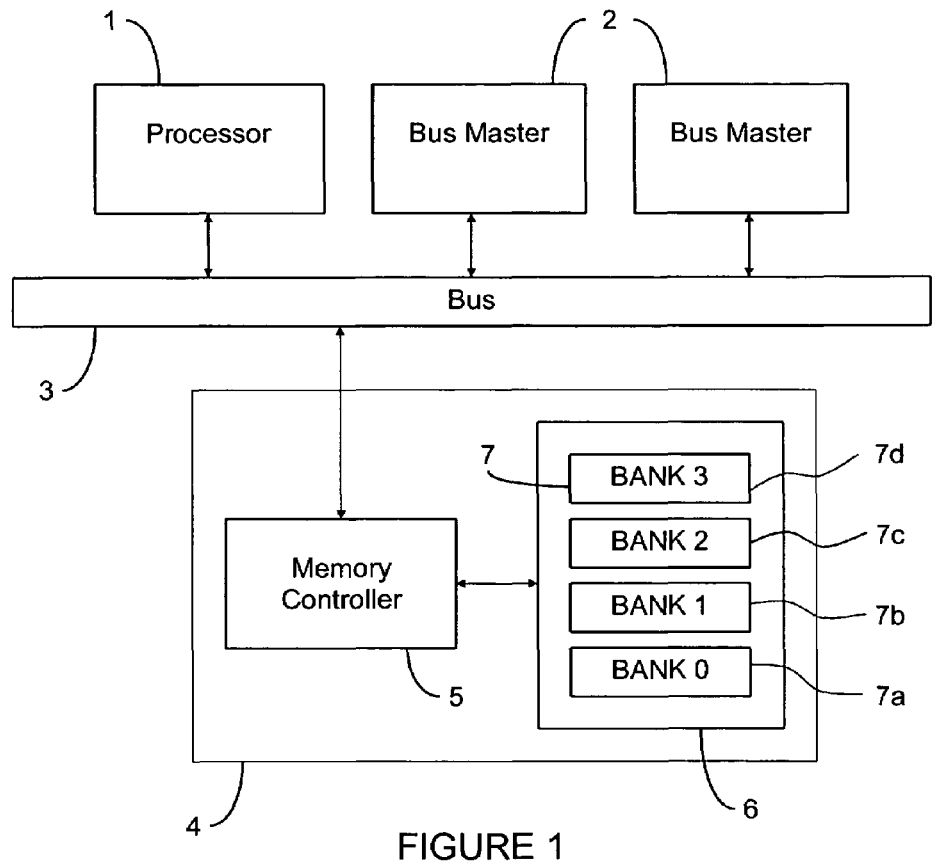
FIG. 1 is a block diagram of a known computer system.

The bus typically comprises an address bus 3a, a control bus 3b and a data bus 3c, as is known in the art. A processor and one or more bus masters are coupled to the bus, (similarly to the arrangement of FIG. 1), such that the memory system 10 is accessible concurrently by different bus masters, i.e. access to the memory system 10 is shared.

The memory module 12 comprises a plurality of memory banks 13. In the embodiment illustrated in FIG. 2 the memory module 12 comprises four memory banks 13a-13d. The memory module 12 is, for example, a double data rate (DDR) synchronous dynamic random access memory (SDRAM) module having four memory banks. However, other memory modules having a plurality of memory banks may alternatively be used including, but not limited to FPM DRAM, EDO DRAM, SRAM and RDRAM. Moreover, the memory system 10 may include more than one memory module 12, which may be provided as, for example, SIMM, DIMM or SO-DIMM. Additionally, the memory module 12 may be removable from the memory system 10, e.g. provided as a memory card or stick.

The memory controller 11 comprises an arbiter 14, a command-queue buffer 15, a write-queue buffer 16, and a memory-interface controller 17.

The memory controller 11 receives access requests (or commands) over the bus, such as read data from or write data to the memory module 12. A read-data request typically comprises a read control-signal received over the control bus 3b and an address signal received over the address bus 3a, the address signal providing the address of the memory module 12 from which data is to be read. The requested data, when retrieved by the memory controller 11 from the memory module 12, is then delivered over the data bus 3c to the bus master making the read-data request. A write-data request typically comprises a write control-signal received over the control bus 3b, an address signal received over the address bus 3a, and a data signal received over the data bus 3c, the address signal providing the address of the memory module 12 to which the data is to be written.

The arbiter 14 employs a finite state machine to schedule access requests received over the bus so as to optimise the available bandwidth. For example, the arbiter 14 prevents the occurrence of access conflicts. Various arbiter scheduling algorithms are known and are not therefore described here in any detail. The arbiter is preferably programmable such that different scheduling algorithms may be employed according to, for example, the type and size of the memory module 12, the bandwidths (data rates) of the buses 3a-3c, and the type and number of bus masters.

The arbiter 14 places the scheduled access requests in a command-queue buffer 15. The queued requests are then executed in turn by the memory interface controller 17.

When the memory controller 11 receives a write-data request, the arbiter 14 places the data received over the data bus 3c in the write-buffer queue 16. The data stored in the write-buffer queue 16 is then passed to the memory-interface controller 17 when the corresponding access request held in the command-queue buffer 15 reaches the head of the queue.

The write-queue buffer 16, is optional. If the write-queue buffer 16 is omitted, data to be written to the memory module 12 may be sent in contiguous cycles until such time as the corresponding access request held in the command-queue buffer 15 reaches the head of the queue. Additionally, the memory-interface controller 17 may be operable such that, upon receiving a write-data request from the command-queue buffer 15, the request is performed only when the memory-interface controller 17 also receives the data to be written. In this manner, the data to be written may be sent by a bus master at some stage after the write-data request has been sent.

When the memory controller 11 receives an access request to read or write non-program data to the memory module 12, the arbiter 14 places the request in the command-queue buffer 15 in accordance with the scheduling algorithm that is employed. As will now be described, the arbiter 14 of the memory controller 11 departs from known scheduling algorithms when the data to be read from or written to the memory module 12 is program data.

When the memory controller 11 receives an access request to write program data, the arbiter 14 places two write requests into the command-queue buffer 15. Additionally, the arbiter 14 places two copies of the program data into the write-queue buffer 16, each copy of the program data corresponding to a write request placed in the command-queue buffer 15. Each of the write requests queued by the arbiter 14 includes an address to a different memory bank 13 such that a copy of the program data is written to two different memory banks. For example, the arbiter 14 may queue a first write request to write program data to BANK 0 13a and a second write request to write program data to BANK 1 13b.

If the write-queue buffer 16 is omitted from the memory controller 11, the bus master responsible for issuing the request to write program data is required to send the program data over at least two cycles. For example, the program data may be sent by the bus master in contiguous cycles until such time as both write requests held in the command-queue buffer 15 have been executed by the memory-interface controller 17.

Generally speaking, the program data is written to the memory module 12 before the processor 1 starts to execute the program data and before any non-program data is written to the memory module 12, i.e. the first access to memory module 12 is generally the writing of program data. There may be instances, however, in which requests to write program data occur concurrently with or after requests to read or write non-program data. The arbiter 14 is therefore preferably operable to place requests to write program data ahead of any access requests to read or write non-program data. Accordingly, the more important access requests involving program data are prioritised over non-program data.

Owing to the size of each memory bank 13, which at present may be as much as 512 MB, program data generally occupy only a fraction of a memory bank 13. Accordingly, when the memory controller 11 receives an access request to write non-program data to the memory module 12, the arbiter 14 is operable to write the non-program data to any of the available memory banks 13a-13d, including the two memory banks 13a, 13b storing program data. In this manner, efficient use is made of the available memory.

As described below, particular benefits of the present invention are realised when the program data occupy less than half of a memory bank 13. Nevertheless, there may be occasions in which the program data occupy more than half of the memory bank 13. Accordingly, the arbiter 14 is preferably operable to determine if the program data received from the master 1,2 will occupy more than half of a memory bank 13. If the arbiter 14 determines that the program data will indeed occupy more than half of a memory bank 13, the arbiter 14 places a single write request into the command-queue buffer 15. Accordingly, the program data are written to a single memory bank 13 only, e.g. BANK 0 13a. The arbiter 14 then treats this memory bank 13a as a dedicated memory bank for program data. Consequently, when the memory controller 11 receives a request to write non-program data to the memory module 12, the arbiter 14 places a request in the command-queue buffer 15 to write the non-program data to one of the remaining memory banks 13b-13d, i.e. a memory bank other than that which serves as the dedicated program-data memory bank 13a.

When the memory controller 11 receives an access request to read program data, the arbiter 14 determines which of the memory banks 13a, 13b storing program data will next be available for access. The arbiter 14 then places on the command-queue buffer 15 a request to read program data from the memory bank that will next be available. This request is preferably placed at a position towards the head of the command queue.

Whilst the request is ideally placed at the very front of the queue, this is not always the most efficient method of scheduling. For example, consider the situation in which BANK 0 13a and BANK 1 13b store program data. The first four requests stored in the command-queue buffer 15 are: (1) read data from BANK 0, (2) read data from BANK 1, (3) read data from BANK 2, and (4) read data from BANK 3. The first two commands have been initiated by the memory-interface controller 17. For example, the memory-interface controller 17 has sent ACTIVATE and READ control signals to BANK 0 13a and an ACTIVATE signal to BANK 1 13b. The memory controller 11 then receives an access request to read program data. Since only BANK 0 13a and BANK 1 13b store program data, and both these memory banks 13a, 13b are being accessed, the memory controller 11 is only able to read program data once either BANK 0 13a or BANK 1 13b becomes available for access, i.e. at the end of a bank cycle; in this case BANK 0 will be available first for access. If the arbiter 14 were to place at the very front of the command-queue buffer 15 a request to read program data from BANK 0, the memory-interface controller 17 would have to wait until the BANK 0 had completed its cycle before executing the next request in the command-queue buffer 15. During this time, however, access could be initiated by the memory-interface controller 17 to BANK 2 and BANK 3, i.e. the third and fourth commands could be initiated in the meantime. Accordingly, in this example, it would have been most efficient for the arbiter 14 to insert the request to read program data from BANK 0 immediately after the command to write data to BANK 3, i.e. to insert the new request into third place in the command queue.

In order to maximise scheduling efficiency whilst at the same time prioritising requests to read program data, the arbiter 14 preferably places requests to read program data at a position within the command-queue buffer 15 such that the request is the next command executed by the memory-interface controller 17 once the relevant memory bank (e.g. BANK 0 13a) becomes available for access. Moreover, the arbiter 14 places the request in the queue at a position that does not unnecessarily hinder access to memory banks storing only non-program data (e.g. BANKS 13c, 13d).

By providing shared access to a memory bank 13a that stores program data, the memory system 10 makes efficient use of the available memory. Moreover, by storing identical program data in two different memory banks 13a, 13b, a processor 1 is able to access more readily the program data in comparison to memory systems for which the program data is stored in a single, shared memory bank, i.e. the memory system 10 provides a decrease in the latency of access requests to read program data.

Additionally, since program data generally occupy only a small fraction of a memory bank, the memory system 10 makes more efficient use of memory in comparison to known memory systems which employ a dedicated (i.e. non-shared) memory bank to store only program data. This particular benefit of the memory system 10 is realised only when the program data occupy no more than half of a memory bank 13. Should the program data occupy more than half of a memory bank 13, it is then more memory-efficient to employ a single dedicated memory bank to store program data only. As described above, the arbiter 14 is preferably operable to determine if the program data will occupy more than half of a memory bank 13 and to store either one copy of the program data in a dedicated memory bank should the program data be greater than half a memory bank, or two copies of the program data in two different memory banks should the program data be less than or equal to half a memory bank.

Whilst reference has thus far been made to writing copies of the program data to one or two memory banks according to the size of the program data, the arbiter 14 may be operable to write copies of the program data to any number of memory banks. For example, if the program data occupies no more than a third of a memory bank, identical copies of the program data may be written to three different memory banks. This would then further decrease the latency of access requests to read program data. Whilst writing program code to an increasing number of memory banks will introduce some additional latency, program code is generally resident in the memory module 12 for a significant length of time. Accordingly, any initial increases in the latency of the memory system 10 may be offset by later reductions in latency in reading program data. The number of memory banks 13 to which the program data are written will depend upon, among other things, the size of the program data and the number of available memory banks. Preferably, the maximum number of memory banks (N) to which copies of the program data may be written is equal to the integer division of the size of each memory bank (M) divided by the size of the program data (P), i.e. N=M\P or N=int (M/P).

In embodiments of the memory system 10 in which a copy of the program data is stored in each available memory bank 13, the request to read program data, which is inserted into the command-queue buffer 15 by the arbiter 14, may always be placed at the very front of the command queue.

The memory controller 11, and in particular the arbiter 14, may be hardware-configured to operate in the manner described above. Alternatively, the memory controller 11, and in particular the arbiter 14, may be programmable and include a computer program or suite of computer programs, which when executed, cause the memory controller 11, or arbiter 14, to operate in the manner described above.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A memory controller for coupling to a first memory bank and to a second memory bank, each memory bank storing identical program data, the memory controller being operable to read program data from whichever memory bank is next available for access, wherein the memory controller is further operable to:
   receive a request to write program data;
   write the program data to the first memory bank; and
   write the program data to the second memory bank if the size of the program data is not greater than half the size of the first memory bank.

2. The memory controller according to claim 1, wherein the memory controller is further operable to:
   receive a request to read program data; and
   read, in response, program data from whichever memory bank is next available for access.

3. The memory controller according to claim 1, wherein the first memory bank and the second memory bank store non-program data and the memory controller is further operable to read non-program data from the first memory bank and from the second memory bank.

4. The memory controller according to claim 1, wherein the memory controller is further operable to write non-program data to the first memory bank and to the second memory bank.

5. The memory controller according to claim 1, wherein the memory controller is further operable to:
   receive requests to access the memory banks;
   schedule each received request in a queue;
   determine, in response to a received request to read program data, which memory bank is next available for access; and
   schedule a request to read program data from the memory bank that is determined as being next available for access.

6. A memory controller for coupling to a first memory bank and a second memory bank, the memory controller being operable to:
   receive a request to write program data;
   in response to receipt of the request to write program data, place two write requests into a command-queue buffer, one of the write requests including an address to the first memory bank and the other of the write requests including an address to the second memory bank;
   in response to receipt of the request to write program data, place two copies of the program data into a write-queue buffer, each copy of the program data corresponding to one of the write requests placed in the command-queue buffer;
   write the program data to the first memory bank; and
   write the program data to the second memory bank.

\* \* \* \* \*